United States Patent [19]
Dao

[11] Patent Number: 5,218,843
[45] Date of Patent: Jun. 15, 1993

[54] REGENERATIVE ABSORPTION CYCLES WITH SUPER-PRESSURE BOILER

[76] Inventor: Kim Dao, 12 Nace Ave., Piedmont, Calif. 94611

[21] Appl. No.: 866,445

[22] Filed: Apr. 10, 1992

[51] Int. Cl.⁵ .............................................. F25B 15/00
[52] U.S. Cl. ........................................ 62/476; 62/101
[58] Field of Search ........................ 62/476, 101, 103

[56] References Cited

U.S. PATENT DOCUMENTS

| | | | |
|---|---|---|---|
| 3,742,728 | 7/1973 | Mamiya | 62/476 |
| 4,383,416 | 5/1983 | Phillips | 62/476 |
| 4,667,485 | 5/1987 | Ball | 62/476 |
| 4,732,008 | 3/1988 | DeVault | 62/79 |
| 4,827,728 | 5/1989 | DeVault et al. | 62/79 |
| 5,016,444 | 5/1991 | Erickson | 69/79 |
| 5,097,676 | 3/1992 | Erickson | 62/476 |

OTHER PUBLICATIONS

Kalina, "Combined Cycle and Waste Heat Recovery Power Systems Based On A Novel Thermodynamic Energy Cycle Utilizing Low-Temperature Heat for Power Generation," published by the American Society of Mechanical Engineers, 1983.

Primary Examiner—John M. Sollecito
Attorney, Agent, or Firm—Phillips, Moore, Lempio & Finley

[57] ABSTRACT

An improved regenerative absorption cycle using a super-pressure boiler to achieve a high coefficient of performance (COP). In the basic cycle, an ammonia/water solution is boiled in high-pressure boiling conduit (66). Boiled-off high-pressure ammonia vapor is condensed (96), expanded to low-pressure (99), and boiled in evaporator (101) to extract heat from a refrigerating fluid going to cooling load (104). Low-pressure ammonia vapor from evaporator (101) returns to regenerator (28) and is absorbed back into low-pressure liquid. The low-pressure solution from regenerator (32) is then cooled in absorber (56) to reject heat from the cycle, and is then pumped (58) back to the high-pressure boiling conduit (66). In the present invention, the liquid solution from high-pressure boiling conduit (66) is pumped up to an externally-heated super-pressure boiler (11). Super-pressure ammonia vapor from boiler (11) is absorbed back into super-pressure liquid in absorption super-pressure conduit (26), which functions as an internal heat source to heat the high-pressure boiling super-pressure conduit (66). The super-pressure solution from absorption conduit (26) is expanded (36) to high-pressure to boil at high pressure in heat-sink conduit (38) at a low temperature, which conduit (38) functions as an internal heat sink to absorb heat from the low-pressure fluid in regenerator (28).

14 Claims, 4 Drawing Sheets

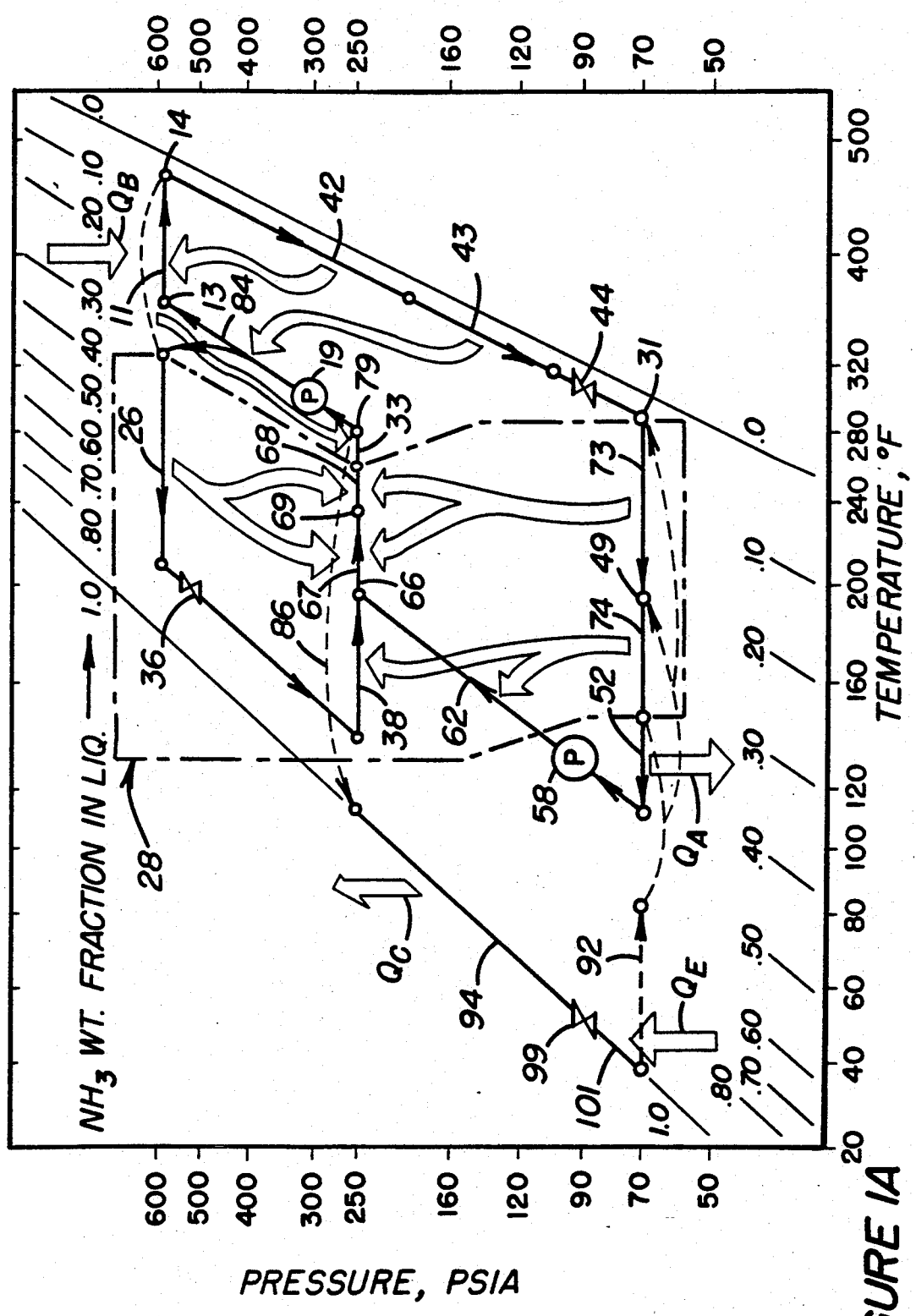
FIGURE IA

REGENERATIVE ABSORPTION CYCLES WITH SUPER-PRESSURE BOILER

This invention relates to absorption cycles using heat as the driving source, and more particularly to improved regeneration absorption cycles having very high coefficients of performance (COP) under broad ranges of operating temperatures.

Regenerative absorption cycles are those in which internal heat coupling between absorption and generation (or boiling) processes are extensively used in an attempt to reduce and to regenerate (or recuperate) internal heats as much as possible. In regenerative absorption cycles, most internal heats are latent heats associated with the boiling or absorption of refrigerant vapor. Therefore, heat recuperation is mostly equivalent to the use of the heat from absorption of vapor into liquid in one part of the cycle to boil the vapor from a liquid solution in another part of the cycle. Vapor regeneration and vapor absorption processes occur at constant pressures over a wide span of temperature and these lend themselves very well to the formation of piecewise pairs of temperature-matched regenerative flow paths that constitute a cycle, and that circulate the working fluids between the external heat source (typically a gas burner) and the external heat-sink (typically an externally-cooler absorber).

Assuming that internal heat recuperation can be made complete, and given a constant external heat-sink temperature, the COP of a regenerative absorption cycle depends only on the temperature of the fluids at the point in the cycle where external heat is applied. The boiling temperature reaches a maximum when the refrigerant content is boiled off as refrigerant vapor and the remaining solution is essentially pure absorbent. The higher the boiling temperature, the higher the COP of the cycle. The boiling temperature is directly related to the pressure in the boiler. The higher the pressure, the higher the boiling temperature.

Typically, the high-pressure refrigerant vapor produced in the boiler is sent directly to an energy exchanging device, such as a turbine or the condenser of a refrigeration system, operating at the same pressure as in the boiler. Thus, if the temperature and pressure in the boiler is increased, the pressure in the energy exchanging device will likewise be increased.

As may be seen, it would be desirable to operate the boiler at a super-pressure, i.e., at a pressure above that of the high-pressure component of the energy exchanging device, in order to increase the COP of the cycle. However, such operation would result in the generation of super-pressure refrigerant vapor that cannot be sent to the energy-exchanging components that are operating at a lower pressure.

Another disadvantage of previously known multiple effect cycles (such as one-and-a-half, double, triple, etc.), is that heat recovery from the first condenser (at high temperature and highest pressure to the second effect generator is confined to a very narrow temperature span dictated by the constant temperature of the first condenser. The boiling concentration in the second effect generator can be optimized to minimize the solution pumping rate, subject to the constraints imposed by the sink temperature and the maximum pressure permissible in the first condenser. Similarly, the pumping rate to the first effect generator is constrained by the first condenser pressure and by the minimum permissible solution concentration. Even under best operating conditions, these pumping rates are high, resulting in large sensible heats to be recuperated and lost. The sensible heats are parasitic and must be minimized since they do not contribute to the production of liquid refrigerant for the evaporator.

It would thus be desirable to provide heat recuperation flow paths involving vapor regenerations that directly produce refrigerant vapor for the condenser, and which occur over larger temperature and concentration spans that reduce parasitic internal heats and that are more adaptable to changing operating temperatures.

SUMMARY OF THE INVENTION

It is the principle object of the present invention to provide improved regeneration absorption cycles that operate at a super-pressure for a higher COP, that have improved heat recuperation flow paths and are commercially practicable.

To achieve the foregoing and other objects, a regenerative-absorption cycle, operating between a low-pressure in an externally-cooled absorber and a higher pressure in a high-pressure boiling conduit to generate high-pressure refrigerant vapor at the pressure of the boiling conduit, is provided with: a super-pressure boiler operating at a temperature and pressure substantially above the temperature and pressure of the high-pressure boiling conduit, a super-pressure absorption conduit for absorbing super-pressure refrigerant vapor from the super-pressure boiler into a super-pressure solution that is relatively weak in refrigerant, with such absorption taking place at a constant pressure and over a large range of temperatures, and means for coupling the heat of absorption in the super-pressure absorber means to the high-pressure boiling conduit.

A further aspect of the invention is that the solution resulting from the absorption at super-pressure in the super-pressure absorption conduit which is relatively rich in refrigerant is expanded down to high-pressure to boil at a low temperature, with such boiling acting as an internal heat-sink in the cycle and also as a source of high-pressure refrigerant vapor for external use.

Additional objects, advantages and novel features of the invention will be set forth in the description which follows, and in part will become apparent to those skilled in the art upon examination of the following, or may be learned by practice of the invention. The objects and advantages of the invention may be realized by the instrumentalities and combinations pointed out in the appended claims.

BRIEF DESCRIPTION OF THE DRAWINGS

The accompanying drawings, which are incorporated in and form part of the application, together with the description, serve to explain the principles of the invention.

FIG. 1A is a pressure-temperature-concentration (PTX) thermodynamic diagram of the cycle of FIG. 1, using ammonia-water as the working fluid pair and showing flow paths and properties of the fluids at main locations in the cycle of FIG. 1. This FIGURE also summarizes the major external and internal heat flow paths of the cycle of FIG. 1.

DESCRIPTION OF THE PREFERRED EMBODIMENTS

Figure 1:
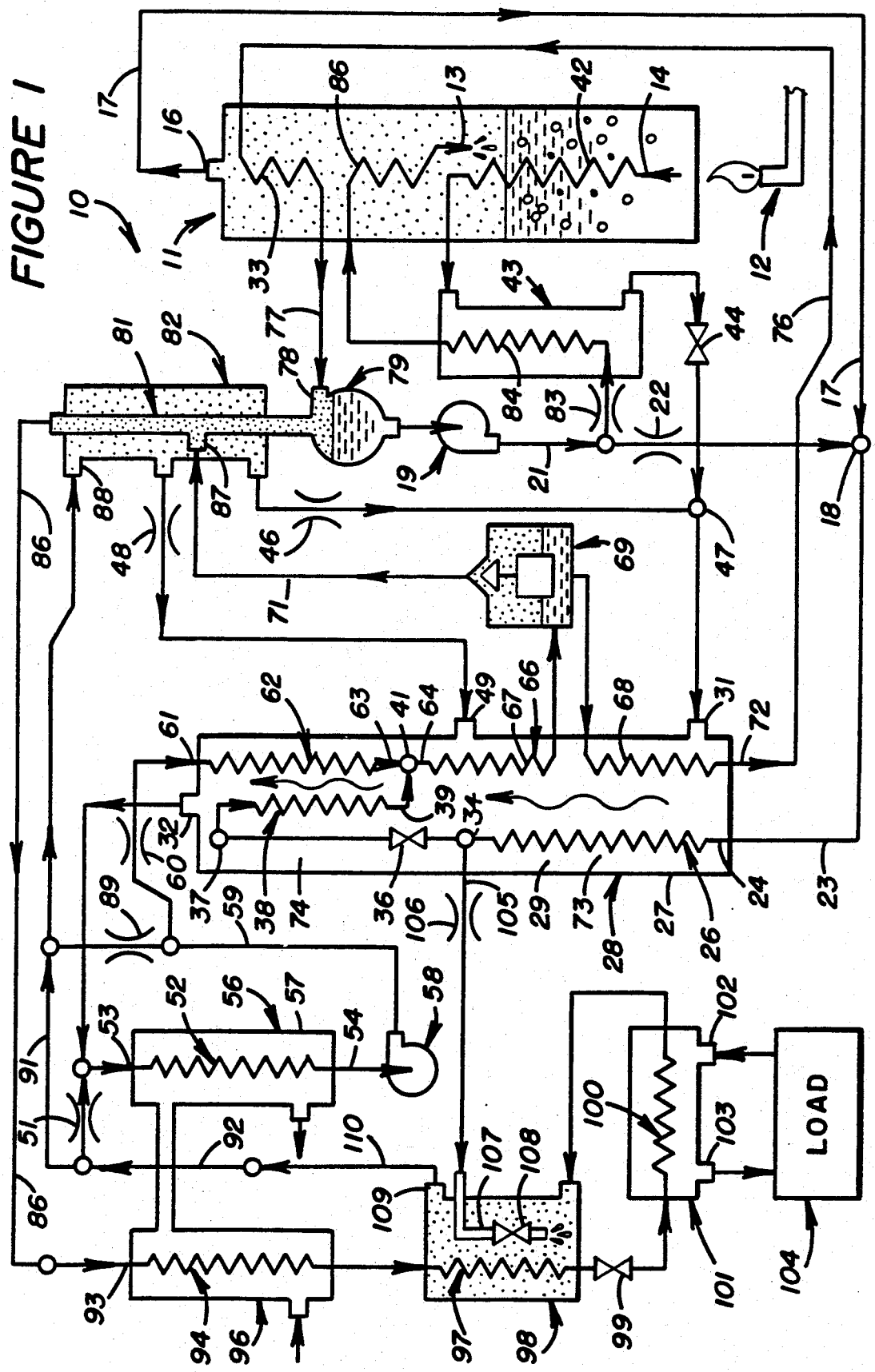
FIG. 1 is a generally schematic illustration of a super-pressure boiler regenerative absorption cycle embodying the principles of the invention and used for a refrigeration process, the cycle using two pumps.

Referring now to the drawings, wherein preferred embodiments are shown, and in particular to the schematic illustration of FIG. 1 and the corresponding PTX diagram of FIG. 1A, wherein a first embodiment is shown, the super-pressure-boiler regenerative-absorption cycle 10 includes a super-pressure boiler 11 that is externally heated, as by a burner 12. The cycle preferably uses ammonia-water or ammonia-brine as the refrigerant-absorbent working fluid pair, but other refrigerated-absorbent fluid pairs may be used. For purposes of illustration the description herein relates to the use of an ammonia-water pair. Although specific operating parameters such as temperatures, pressures, concentrations and flow distributions are discussed below and shown on the PTX diagram, FIG. 1A, it is to be understood that these parameters are set forth merely to illustrate the operation and use of the invention and that the use of the invention is not limited thereto. It will be appreciated that different operating parameters would be expected for optimum results with different fluid pairs.

The super-pressure boiler 11 has a liquid inlet 13, a liquid outlet 14, and a vapor outlet 16. The ammonia-water solution in the interior of the boiler is at a super-pressure of about 600 psia and will be heated to a temperature of about 470° F. to boil off a vapor composed of ammonia and water species. This super-pressure vapor passes out from the vapor outlet 16 to line 17, and mixes in injector 18 with super-pressure liquid coming from pump 19 through line 21 and flow restrictor 22. The fluids from the injector 18 (at about 280° F.) pass through line 23 to the inlet end 24 of the super-pressure absorption conduit 26 inside the shell 27 of regenerator 28.

The interior 29 of regenerator 28 is at low-pressure and is filled with fluid coming in the inlet end 31 and exiting the outlet end 32 thereof.

Absorption of the super-pressure refrigerant vapor into super-pressure liquid will occur in super-pressure absorption conduit 26 which extends physically about halfway through regenerator 28. Turbulence promoters such as twisted tapes or spiral grooves can be used in conduit 26 to increase heat transfer coefficients.

The amount of injected liquid from flow restrictor 22 is important, but not critical. It can be anywhere from 0 to 50% of the mass flow rate in line 17, depending on how well the vapor is rectified (and cooled down) before entering line 17, and on the permissible pressure in the interior of super-pressure boiler 11. More fluid injected means lower pressure and lower COP. Less fluid injected and less absorbent concentration in line 17 (i.e., well rectified vapor) means higher pressure and again lower COP. Practically, with a limited rectification that heat exchanging conduit 33 (in boiler 11) can provide, the absorbent concentration in line 17 is about 10%, and without liquid injection the boiler pressure (which is determined by the lowest temperature attainable in absorption conduit 26) may reach 750 psia. The pressures in super-pressure absorption conduit 26 and super-pressure boiler 11 are essentially equal.

It is important that super-pressure absorption conduit 26 has a high product (UA) of heat transfer coefficient (U) times heat transfer area (A) to achieve a high COP. The best COP is obtained with a liquid injection from flow restrictor 22 of about 30% of the mass flow rate in line 17, which translates to about 10% of the output of pump 19. The COP can decrease by 5% when the liquid injection is off design value.

The outlet end 34 of super-pressure absorption conduit 26 is about mid-length of regenerator 28. At this point, all vapor from conduit 17 will have been absorbed, with the heat of absorption being given up to conduit 66 directly or through the low-pressure fluid in the regenerator shell. The pressure of the resulting liquid from the absorption conduit 26, at about 200° F., is reduced by expansion valve 36, from super-pressure (600 psi) down to a high pressure of about 250 psia. Since the concentration of the liquid exiting expansion valve 36 is high (about 75% ammonia) it will start boiling at a low temperature (about 140° F.), and the liquid is introduced into the low-temperature inlet end 37 of the heat-sink conduit 38. Heat from the fluid flowing through the regenerator shell is absorbed by the fluid in heat-sink conduit 38, and boiling continues in conduit 38 from its inlet end 37 to its outlet end 39 located at about the middle of regenerator 28. The temperature at the outlet end of heat-sink conduit 38 and at connector 41 is about 195°.

The above described flow paths constitute the essence of the present invention: the boiling of a refrigerant-absorbent solution to produce refrigerant vapor at super-pressure and very high temperatures; the absorption of this vapor at super-pressure into absorbent liquid, in super-pressure absorption conduit 26, to create an internal heat source extending over a large temperature span (280° F. to 200° F.); the expansion of the solution produced by the above absorption to high-pressure and the boiling of this solution at high-pressure in heat-sink conduit 38 to create an internal heat-sink extending across a large temperature span (140° F. to 195° F.). The created internal heat source along the length of regenerator 28 from its high temperature inlet end 31 and the created internal heat sink along the length of the regenerator from its low-temperature outlet end 32 can be coupled to fluid flow paths entering and leaving the regenerator of suitable absorption cycles operating between the high and low-pressures.

The balance of FIGS. 1 and 1A illustrate a simple form of a regenerative absorption cycle, namely, a Generator Absorber Heat Exchange (GAX) cycle operating between high and low-pressures and the manner in which the above described internal heat source (i.e., super-pressure absorption conduit 26) and heat-sink (i.e., heat-sink conduit 38) are coupled thereto.

The flow paths described below are essentially those of such a GAX cycle with the modification that the high-pressure fluid which is normally boiled by an externally-heated generator is pumped up for boiling at a pressure much higher than that of the condenser, so that the conventional generator is replaced by the super-pressure boiler 11.

(The conventional externally-heated high-pressure generator can be partially retained, with a reduced flow bled off from the flow line feeding the pump 19 to the super-pressure boiler 11. The COP will improve slightly, but the cost of the retained generator would outweigh its performance.)

The remaining liquid of the ammonia-water solution that boils in super-pressure boiler 11 (to produce the vapor in line 17) is called the weak solution (or strong absorbent). The weak solution enters the liquid outlet 14 of the boiler, and is cooled in conduit 42 through the temperature gradient of the boiling solution in boiler 11, to about 360° F. when it exits the boiler. The weak solution then passes through the interior of heat exchanger 43, and is further cooled therein. The super-pressure of the weak solution is then reduced to the low-pressure (about 70 psia) of the cycle by expansion valve 44. The weak solution, now at a temperature of about 290° F. has low-pressure vapor from flow restrictor 46 injected thereinto, by injector 47, and the low-pressure liquid and vapor enter the inlet end 31 of the regenerator shell.

Absorption of the low-pressure vapor by the weak solution continues in the shell side of the regenerator from the inlet end 31 to the outlet end 32, to provide a heat source resulting from the heat of absorption. Additional low-pressure vapor from flow-restrictor 48 is fed into the regenerator through an intermediate vapor inlet 49. The use of multiple vapor inlets to feed low-pressure vapor into the absorption process of the weak solution reduces pressure and temperature drops associated with large vapor flow rates and with the mixing of large amounts of cool vapor to hot solutions. If flow restrictors 46 and 48 are properly sized, only a saturated solution emerges from the outlet end 32 of the regenerator shell. This saturated solution has low-pressure vapor from flow restrictor 51 injected thereinto, with vapor absorption taking place in low-pressure cooling conduit 52 from its inlet end 53 to its outlet end 54. As shown specifically in FIG. 1, low-pressure cooling conduit 52 may be the internal conduit of a conventional externally-cooled absorber 56 with conduit 52 being cooled by external heat-sink cooling fluid circulating through the shell 57 of the absorber 56. A relatively strong solution exist the outlet end of the low-pressure cooling conduit 52 at a temperature of about 110° F. Pump 58 increases the pressure of this solution to the high-pressure of the cycle, about 250 psia, which corresponds to a condensing temperature of 110° F. ammonia refrigerant.

About 94% of the output of pump 58 goes through line 59 and flow restrictor 60 to the inlet end 61 of the high-pressure heating conduit 62. The strong solution in conduit 62 is at a relatively high pressure and low temperature and therefore will not boil until heated to about 195° F. The heat transfer area of high-pressure heating conduit 62 is designed so that the solution therein will start boiling when it leaves the outlet end 63 of the conduit and reaches connector 41 where it merges with the mixture of liquid and vapor coming from the heat-sink conduit 38.

The mixture of liquid and vapor then enters the inlet end 64 of the high-pressure boiling conduit 66. Preferably high-pressure boiling conduit 66 comprises serially connected conduits 67 and 68. Boiling continues in conduit 67, with the mixture of boiling liquid and vapor then entering float valve 69. The vapor component of the mixture is bled off through line 71, with the remaining liquid reentering the regenerator to continue boiling in conduit 68. At the outlet end 72 of the high-pressure boiling conduit 66, the temperature of the mixture is about 260° F.

The extraction of vapor by float valve 69 reduces heat duty and pressure drops in conduits 68 and 33 (in super-pressure boiler 11), and improves heat transfer. More float valves can be inserted along conduit 66 and 33 for further improvement, but the benefits diminish rapidly.

The absorption of low-pressure vapor by the weak solution in the shell side of regenerator 28 can be divided into two regimes: a high temperature regime 73 (from about 280° F. to 200° F. occurring in the interior portion of the regenerator 28 extending from its inlet end 31 and occupied by the super-pressure absorption conduit 26, and a low-temperature regime 74 (from about 200° F. to 140° F.) in the interior portion of the regenerator extending from its outlet end 32 and occupied by the heat-sink conduit 38. The heat released by low-pressure vapor absorption in the weak solution in the high temperature regime 73 is not sufficient to produce the necessary boiling in the high-pressure boiling conduit 66, but supplemental heat for boiling in conduit 66 is provided by the super-pressure vapor absorption in conduit 26.

Conversely, the heat released by low-pressure absorption in the low-temperature regime 74 of the regenerator is in excess of the amount of heat needed to sensibly raise the temperature of the strong absorbent in high-pressure heating conduit 62 to the boiling temperature of 195° F. This excess heat of absorption would normally have to be rejected from the cycle by the externally-cooled absorber 56. However, in the present cycle, this excess heat is recuperated to boil the solution in heat-sink conduit 38 and produce extra high-pressure vapor for external work.

The boiling solution in conduit 68 leaves the regenerator 28 and passes through line 76 to the heat exchange conduit 33 in super-pressure boiler 11, where it is further heated by the hot vapor boiled off from the solution in boiler 11. Conduit 33 is connected by line 77 to inlet 78 of separator 79. The liquid component of the mixture exits the separator and passes to the super-pressure pump 19. The vapor component of the mixture in separator 79 flows upwardly to the internal conduit 81 of rectifier 82.

About 10% of the output of super-pressure pump 19 is delivered through flow restrictor 22 to injector 18. The remaining output of super-pressure pump 19 passes through flow restrictor 83, is heated in conduit 84 of heat exchanger 43, is further heated in conduit 86 in super-pressure boiler 11, and then enters the boiler to replenish the ammonia-water solution in the interior of the super-pressure boiler 11.

The rectifier 82 cools and rectifies the refrigerant vapor from separator 79. The refrigerant condensate in rectifier conduit 81 will drain back into the separator by gravity, so that the vapor passing from conduit 81 to line 86 will be essentially pure ammonia. Ammonia vapor from float valve 69 will enter rectifier conduit 81 at inlet 87.

The rectifier conduit 82 is cooled by a mixture of low-pressure liquid and vapor entering the rectifier inlet 88. The low-pressure liquid component comes from pressure-reducing flow restrictor 89 that bleeds off about 6% of the output of pump 58, while the low-pressure vapor comes from line 91. This mixture of low-pressure components is heated in rectifier 82 by the high-pressure vapor in conduit 81 and boils, with low-pressure vapor passing from the rectifier through flow restrictors 48 and 46 for absorption into the weak solution into the regenerator 28. With proper sizing of flow restrictor 89, very little low-pressure liquid is left when the low-pressure mixtures from rectifier 82 reaches the flow restrictor 46.

The cool high-pressure vapor exiting conduit 81 of rectifier 82 passes out to end use components by line 86 and returns, at low-pressure, by line 92 to complete the cycle 10. The end use components will function as energy exchanging means to produce work, such as by a vapor driven turbine or as refrigeration. For purposes of illustration, the end use components of FIG. 1 are designed to produce refrigeration. The refrigerant vapor in line 86 enters the high-pressure inlet 93 of conduit 94 in externally-cooled condenser 96 and is condensed therein by the external coolant (typically at ambient temperature) passing through the shell side of condenser 96. The same coolant can be used for cooling in absorber 56, if desired.

The condensed refrigerant then passes through conduit 97 in precooler 98 for further cooling before it reaches expansion valve 99. This valve will reduce the pressure of the condenser refrigerant to about 70 psia, low enough for the liquid refrigerant to boil at 38° F. in conduit 100 of evaporator 101. A suitable refrigeration medium will enter the inlet 102 of the shell of evaporator 101 and will exit the outlet 103 at 38° F. for use in the refrigerating load 104. Thus, the condenser 93, expansion valve 99 and evaporator 101 of FIG. 1 constitute an energy exchanging means wherein the energy of the high-pressure refrigerant fluid entering the condenser is exchanged in evaporator 101 and used to produce refrigeration of the load 104.

To slightly increase the COP (by about 2%), the super-pressure solution exiting the super-pressure absorption conduit 26 in regenerator 28 can be tapped by line 105 so that a small amount of this solution can pass through flow restrictor 106 to enter conduit 107 in precooler 98. Expansion valve 108 reduces the pressure of the solution to the low-pressure of the vapor coming into the precooler 98 from the conduit 100 in evaporator 101 so that the solution will boil in the precooler 98 to further precool the liquid refrigerant in conduit 97. The low-pressure vapor in precooler then exits outlet 109 for return by line 110 to line 92 of cycle 10.

FIG. 1A also illustrates, with flow arrows, the external and internal heat flows of the system of FIG. 1. The external heat added to the system is $Q_B$ (the heat input from burner 12 to the boiler 11) plus $Q_E$ (the heat from the fluid from cooling load 104 that is cooled in the shell side of evaporator 101). The heat rejected from the system is $Q_C+Q_A$, the heats absorbed by the heat-sink fluid passing through the shell sides of condenser 96 and absorber 56 respectively. Ideally, $Q_B+Q_E=Q_C+Q_A$. The COP of the system is the ratio $Q_E/Q_B$ of the desired cooling effect $Q_E$ to the heat input to the boiler $Q_B$.

The main internal heat exchange flow paths are as follows. Heat from the super-pressure absorption conduit 26 and from the high temperature portion 73 of regenerator 28 is used to boil the fluid in the high-pressure conduits 67 and 68. Heat from the low-temperature portion 74 of the regenerator 28 is used to heat the fluids passing through conduits 62 and 38. Additionally, heat from liquid taken from the hottest point in boiler 11, i.e., at the liquid outlet 14, is first used, in heat exchanger conduit 42, to help heat the liquid in the boiler and is then used in heat exchanger 43, to preheat the liquid coming into super-pressure boiler 11. The heated vapor in boiler 11 is used to help boil the fluid passing through conduit 33 in boiler 11 on its way to separator 79.

The particular regenerator 28, as shown in FIG. 1 with, internal conduits 26, 38, 62, 67 and 68, is a most effective and economical way to transfer heat between the flow streams involved. However, other ways to exchange heat are possible, such as by the use of intermediate heat transfer fluids that circulate and release and extract heat to and from each flow stream in separated conduits or the splitting of regenerator 28 into multiple parallel and serial components each having a matching set of heat exchanging conduit and shell elements.

Figure 2:
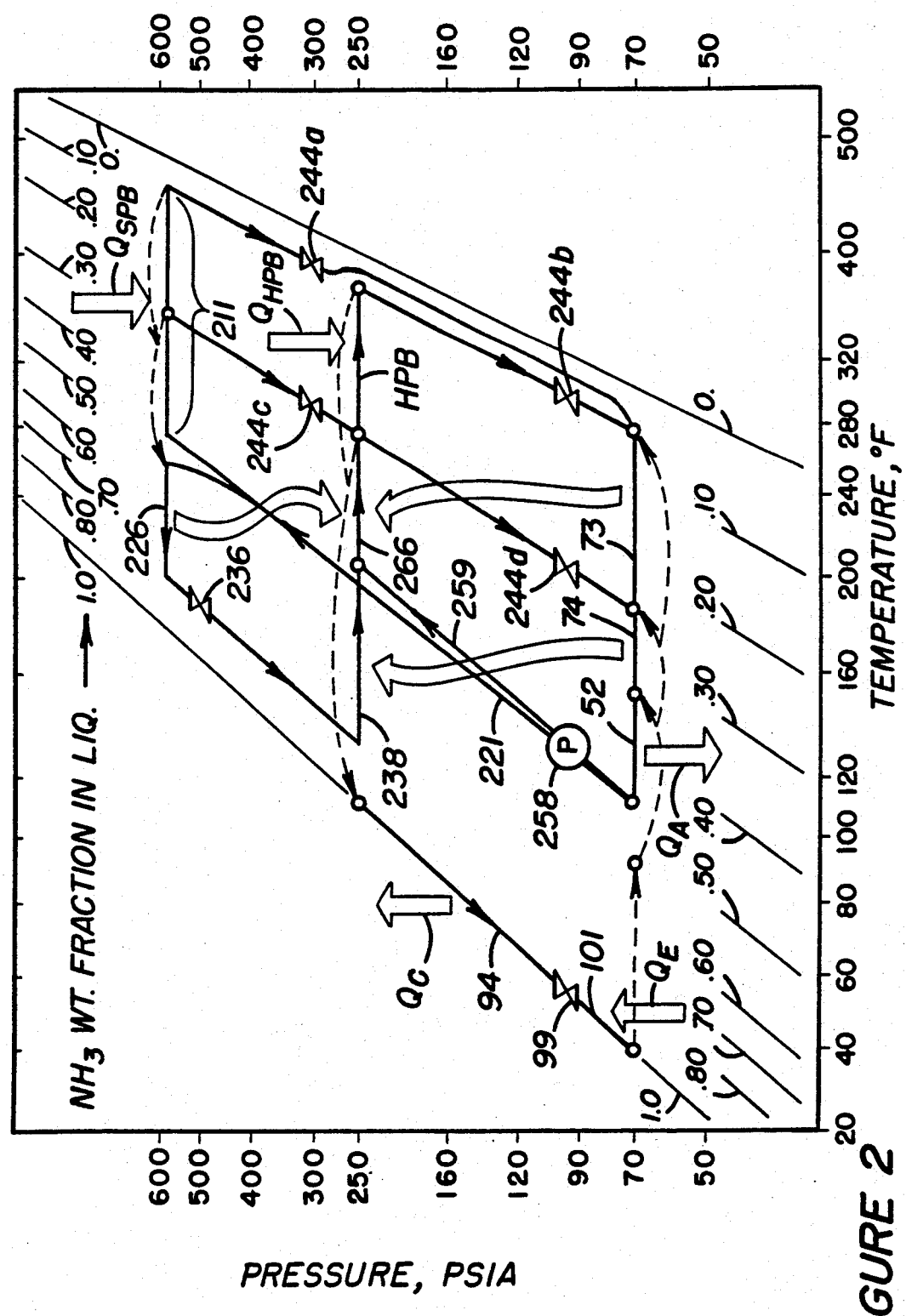
FIG. 2 is a PTX diagram of another embodiment of the invention, using only a single pump.

FIG. 2 shows a PTX diagram of another super-pressure-boiler regenerative absorption cycle 210 wherein the super-pressure boiler 211, the super-pressure internal heat source (super-pressure absorption conduit 226) and high-pressure internal heat-sink (heat-sink conduit 238) of the present invention are coupled to a single effect cycle. The PTX diagram of FIG. 2 can be readily translated into a physical embodiment by those skilled in the art upon examination of the relationships between the described structure shown in FIG. 1 and its corresponding PTX diagram of FIG. 1A. The same is also true with respect to FIG. 3.

In the cycle of FIG. 2, a single pump 258 is used to pump up liquid at high-pressure through line 259 to the high-pressure boiling conduit 266 and also to pump up liquid at super-pressure through line 221 to the super-pressure boiler 211 and to the inlet of the super-pressure absorption conduit 226. As before, super-pressure refrigerant vapor from boiler 211 goes to super-pressure absorption conduit 226 for absorption and the production of heat. The pressure of the solution from super-pressure absorption conduit 226 is reduced to high-pressure by expansion valve 236 and the solution then boils in heat-sink conduit 238.

Also as before, the refrigerant vapor boiled off in the high-pressure boiling conduit 266 goes to the high-pressure vapor inlet of condenser conduit 94.

The preferred liquid return from the super-pressure boiler 211 to the regenerator is by way of expansion valve 244a. However, if desired it is possible to return a solution richer in ammonia through expansion valves 244c and 244d to the regenerator.

If desired, a conventional high-pressure externally-heated boiler HPB may also be used, such boiler being fed by the solution coming from the high-pressure boiling conduit 266. The refrigerant vapor from the high-pressure boiler will go to the condenser conduit 94, while the liquid returns through the expansion valve 244b to the regenerator. The COP of the cycle will improve slightly with the additional use of the high-pressure boiler HPB, but the cost of this boiler will outweigh its performance.

FIG. 2 also shows the major heat flow in the cycle. In this cycle, the COP is equal to $Q_E/(Q_{SPB}+Q_{HPB})$, wherein $Q_{SPB}$ and $Q_{HPB}$ are the external heat inputs to the super-pressure boiler 211 and the high-pressure boiler HPB. The major internal heat flows are substantially as before with the heat from the high-temperature regenerator section 73 and from the super-pressure absorption conduit 226 being used to boil the solution in high-pressure conduit 266 and with the high-pressure heat-sink 238 absorbing heat to cool the low-temperature portion 74 of the regenerator.

The COP of the cycle of FIG. 2 is lower (maximum COP 1.5, practical COP=1.2) than that of the cycle of FIG. 1, (maximum COP=1.8, practical COP=1.4) but it has an economic advantage in that only one pump is needed to pump up to high-pressure and to super-pressure.

Figure 3:
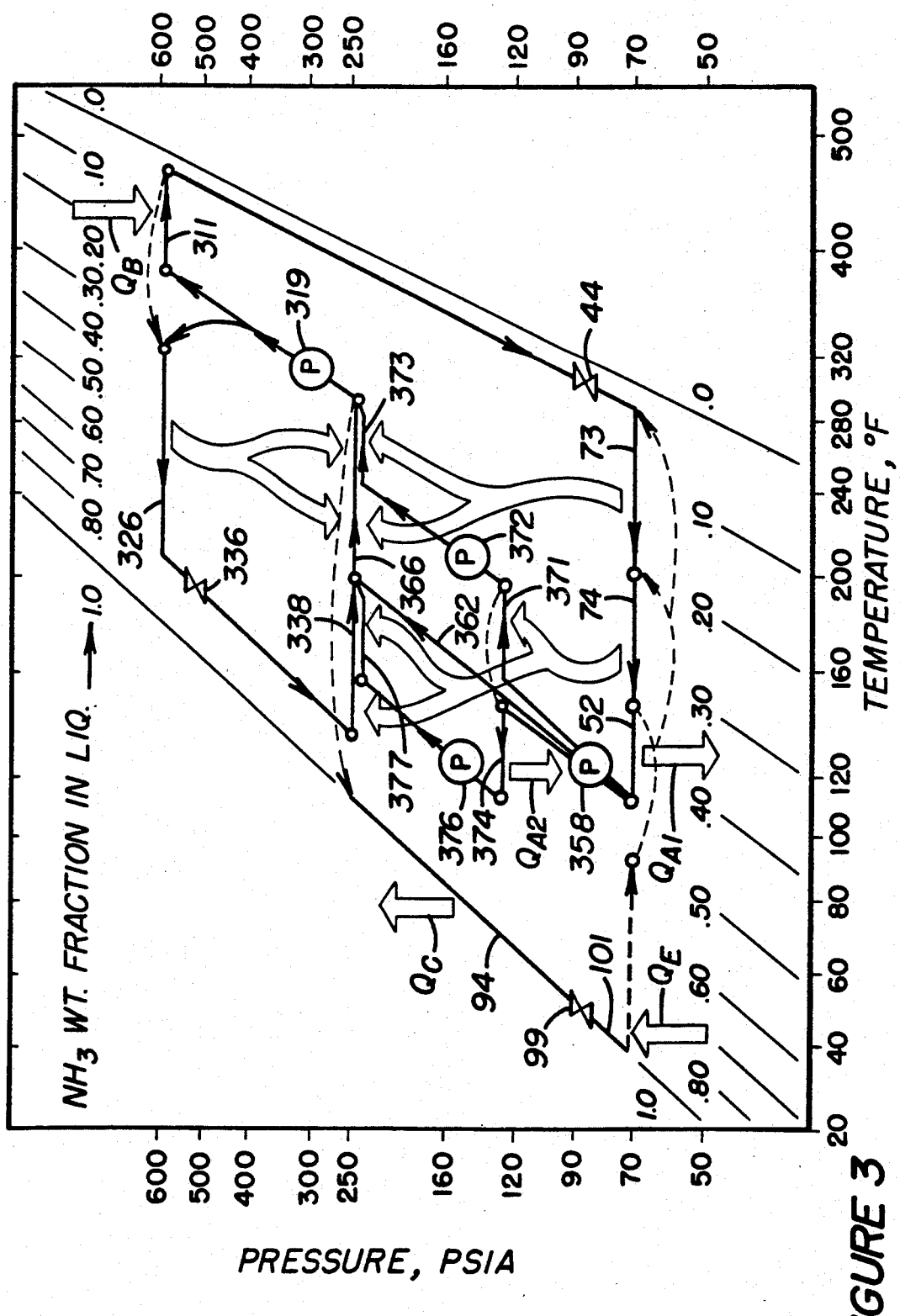
FIG. 3 is a PTX diagram of yet another embodiment of the invention, as applied to a regenerative-absorption cycle with a multiple-stage externally-cooled absorber.

FIG. 3 shows a PTX diagram of yet another super-pressure-boiler regenerative absorption cycle 310, wherein the super-pressure boiler 311, the super-pressure absorption conduit 326 (acting as an internal heat source at super-pressure), and high-pressure internal heat-sink conduit 338 (acting as an internal heat sink at high-pressure) are coupled to a regenerative absorption cycle with a multi-stage absorber (such as shown in my patent application Ser. No. 751,565, filed Jun. 14, 1991, and entitled "Regenerative Absorption Cycles With Multiple State Absorber," the disclosure of which is incorporated herein by reference), and with the high-pressure boiler being replaced by the super-pressure boiler 311.

In the cycle of FIG. 3, pump 358 pumps low-pressure liquid from low-pressure cooling conduit 52 (in absorber 56) through line 362 to the high-pressure boiling conduit 366. The high-pressure vapor therefrom goes to the condenser conduit 94, while the high-pressure liquid therefrom is pumped up by pump 319 to the super-pressure boiler 311 and the super-pressure absorption conduit 326. The super-pressure liquid from boiler 311 returns by expansion valve 44 to the regenerator while the super-pressure vapor passes to the super-pressure absorption conduit 326 for absorption into the super-pressure liquid therein. The solution from super-pressure absorption conduit 326 is reduced in pressure by expansion valve 336, boils in the high-pressure heat-sink conduit 338, and then passes to the boiling conduit 366.

In addition, pump 358 pumps low-pressure liquid to an intermediate-pressure boiling conduit 371 wherein boiling of the solution takes place. The remaining liquid from conduit 371 is pumped up, by pump 372, to the high-pressure boiling conduit 373, wherein further boiling takes place. The vapor and remaining liquid from conduit 373 are then sent to the condenser conduit 94 and the super-pressure boiler 311, respectively.

The intermediate-pressure vapor from boiling conduit 371 passes to the absorber conduit 374 for absorption into intermediate-pressure liquid from pump 358. Absorber conduit 374 is externally cooled, as is absorber conduit 52, to reject heat from the cycle. The rich solution from absorber conduit is pumped up, by pump 376 to the high-pressure boiling conduit 377. The solution therein then passes to the high-pressure boiling conduit 366.

As is shown in FIG. 3, the heat is rejected from the cycle at low temperatures by the multistage absorber, i.e. by the externally-cooled absorber conduits 52 and 374 is equal to $Q_{A1}+Q_{A2}$. Internally, heat from both the high temperature portion 73 of the regenerator and also from the super-pressure absorption conduit 326 is used to heat the high-pressure boiling conduits 366 and 373. Heat from the low temperature portion 74 of the regenerator is used to heat the high-pressure boiling conduit 377 and is absorbed by the high-pressure heat-sink conduit 338.

The cycle of FIG. 3 has a very high COP (maximum COP=2.1, practical COP=1.55), but it requires four pumps.

In the cycle of FIG. 1, the pumps 58 and 19 together function as a pumping means for supplying high-pressure liquid to the high-pressure boiling conduit 66, and for supplying super-pressure liquid to the super-pressure boiler 11 and to the super-pressure absorption conduit 26, with pump 58 serving as a first pump for pumping low-pressure liquid from the outlet end 54 of the low-pressure cooling conduit 52 to the inlet end 64 of the high-pressure boiling conduit 66, and with pump 19 serving as a second pump for pumping high pressure liquid from the liquid outlet 2 of the high-pressure boiling conduit 66 to the liquid inlet 13 of the super-pressure boiler 11 and to the inlet end 24 of the super-pressure absorption conduit 26. The same is true with respect to the cycle of FIG. 3 and the corresponding pumps 358 and 319.

In the cycle of FIG. 2, the pumping means for supplying high-pressure liquid to the high-pressure boiling conduit 66 and super-pressure liquid to the super-pressure boiler 11 and to the super-pressure absorption conduit 26 comprises a single pump 258 for pumping low-pressure liquid from the outlet end 54 of the low-pressure cooling conduit 52 to the inlet end of the high-pressure boiling conduit 266 and also to the liquid inlet of the super-pressure boiler 211 and to the inlet end of the super-pressure absorption conduit 256.

The foregoing description of the preferred embodiments has been presented for the purpose of illustration and description. It is not intended to be exhaustive or to limit the invention to the precise feature described, and obviously many other modifications and variations are possible in light of the above teaching. The embodiments were shown in order to explain most clearly the principles of the invention and the practical applications thereby to enable others in the art to utilize most effectively the invention in various other modifications as may be suited to the particular use contemplated. It is intended that the scope of the invention be defined by the claimed appended thereto.

I claim:

1. A super-pressure-boiler regenerative absorption cycle operating at a low pressure, a high pressure, and a super pressure and comprising:
   a) a super-pressure boiler having a liquid inlet and liquid and vapor outlets,
   b) means for heating said boiler,
   c) a low-pressure cooling conduit having inlet and outlet ends,
   d) means for cooling fluid passing through said cooling conduit,
   e) energy exchanging means having a high-pressure vapor inlet and a low-pressure vapor outlet,
   f) a regenerator having a shell with a low-pressure interior and with spaced apart inlet and outlet ends,
   g) means for connecting said liquid outlet of said super-pressure boiler to the inlet end of said regenerator and for reducing the pressure from super-pressure to low-pressure,
   h) means for connecting said outlet end of said regenerator to the inlet end of said cooling conduit,
   i) a super-pressure absorption conduit having inlet and outlet ends,
   j) a high-pressure boiling conduit having at least a portion thereof in heat transfer coupling with the interior of said regenerator and with said super-pressure absorption conduit, said high-pressure boiling conduit having an inlet end and a vapor outlet,
   k) means connecting said vapor outlet of said high-pressure boiling conduit to the high-pressure vapor inlet of said energy exchanging means,
   l) means connecting said low-pressure outlet of said energy exchanging means to the inlet end of said regenerator shell.

m) pumping means for supplying high-pressure liquid to the inlet end of said high-pressure boiling conduit, and for supplying super-pressure liquid to the liquid inlet of said super-pressure boiler and to the inlet end of said super-pressure absorption conduit, n) means connecting the vapor outlet of said super-pressure boiler to the inlet end of said super-pressure absorption conduit, o) means connecting and reducing the pressure from the outlet end of said super-pressure absorption conduit to the inlet end of said high-pressure boiling conduit.

2. A super-pressure-boiler regenerative absorption cycle as set forth in claim 1, wherein said high-pressure boiling conduit has a liquid outlet and wherein said pumping means includes:

a first pump for pumping low-pressure liquid from the outlet end of said cooling conduit to the inlet end of said low-pressure high-pressure boiling conduit, and a second pump for pumping high-pressure liquid from the liquid outlet of said high-pressure boiling conduit to the liquid inlet of said super-pressure boiler.

3. A super-pressure-boiler regenerative absorption cycle as set forth in claim 2, wherein said second pump of said pumping means also has the function of pumping liquid from the liquid outlet of said high-pressure boiling conduit to the liquid inlet of said super-pressure absorption conduit.

4. A super-pressure-boiler regenerative absorption cycle as set forth in claim 1, wherein said pumping means includes a single pump for pumping low-pressure liquid from the outlet end of said low-pressure cooling conduit to the inlet end of said high-pressure boiling conduit and also to the liquid inlet of said super-pressure boiler.

5. A super-pressure-boiler regenerative absorption cycle as set forth in claim 4, wherein said single pump of said pumping means also has the function of pumping low-pressure liquid from the outlet of said low-pressure cooling conduit to the inlet end of said super-pressure absorption conduit.

6. A super-pressure-boiler regenerative absorption cycle as set forth in claim 1, wherein said energy exchanging means includes:

an externally-cooled condenser having a high-pressure vapor inlet and a liquid outlet, an externally-heated evaporator having a low-pressure liquid inlet and a vapor outlet, and pressure reducing means connected between the liquid outlet of said condenser and the liquid inlet of said evaporator.

7. A super-pressure-boiler regenerative absorption cycle as set forth in claim 1, wherein said low-pressure cooling conduit is in an externally-cooled absorber.

8. A super-pressure-boiler regenerative absorption cycle as set forth in claim 1, wherein said means connecting and reducing the pressure from the outlet end of said super-pressure absorption conduit to the inlet end of high-pressure boiling conduit includes:

a heat-sink conduit in heat transfer coupling with the interior of said regenerator, said heat-sink conduit having an inlet end and having an outlet end connected to the inlet end of said high-pressure boiling conduit, means connecting and reducing the pressure from the outlet end of said super-pressure absorption conduit to the inlet end of said heat-sink conduit.

9. A super-pressure-boiler regenerative absorption cycle as set forth in claim 8, wherein said high-pressure boiling conduit has a liquid outlet and wherein said pumping means includes:

a first pump for pumping low-pressure liquid from the outlet end of said low-pressure cooling conduit to the inlet end of said high-pressure boiling conduit, and a second pump for pumping high-pressure liquid from the liquid outlet of said high-pressure boiling conduit to the liquid inlet of said super-pressure boiler.

10. A super-pressure-holder regenerative absorption cycle as set forth in claim 9, wherein said second pump of said pumping means also has the function of pumping liquid from the liquid outlet of said high-pressure boiling conduit to the liquid inlet of said super-pressure absorption conduit.

11. A super-pressure-boiler regenerative absorption cycle as set forth in claim 8, wherein said pumping means includes a single pump for pumping low-pressure liquid from the outlet end of said low-pressure cooling conduit to the inlet end of said high-pressure boiling conduit and also to the liquid inlet of said super-pressure boiler.

12. A super-pressure-boiler regenerative absorption cycle as set forth in claim 11, wherein said single pump of said pumping means also has the function of pumping low-pressure liquid from the outlet of said low-pressure cooling conduit to the inlet end of said super-pressure absorption conduit.

13. A super-pressure-boiler regenerative absorption cycle as set forth in claim 8, wherein the interior of said regenerator has a high-temperature portion extending away from the inlet end thereof and a low-temperature portion extending away from the outlet end thereof, wherein said super-pressure absorption conduit and said high-pressure boiling conduit are disposed in the high-temperature portion of the interior of said regenerator, and wherein said heat-sink conduit is disposed in the low-temperature portion of the interior of said regenerator.

14. A super-pressure-boiler regenerative absorption cycle as set forth in claim 13, wherein said pumping means includes a high-pressure heating conduit having an outlet end connected to the inlet end of said high-pressure boiling conduit, and wherein said high-pressure heating conduit is disposed in the low-temperature portion of the interior of said regenerator.

* * * * *